(12) United States Patent
Linsley

(10) Patent No.: US 9,135,317 B2
(45) Date of Patent: Sep. 15, 2015

(54) IMAGE-CENTRIC DOCUMENTS

(71) Applicant: GOOGLE INC., Mountain View, CA (US)

(72) Inventor: Peter Linsley, Mountain View, CA (US)

(73) Assignee: Google Inc., Mountain View, CA (US)

(*) Notice: Subject to any disclaimer, the term of this patent is extended or adjusted under 35 U.S.C. 154(b) by 363 days.

(21) Appl. No.: 13/838,256

(22) Filed: Mar. 15, 2013

(65) Prior Publication Data

US 2015/0161218 A1 Jun. 11, 2015

Related U.S. Application Data

(60) Provisional application No. 61/653,207, filed on May 30, 2012.

(51) Int. Cl.
*G06F 17/30* (2006.01)
(52) U.S. Cl.
CPC ............................... *G06F 17/30554* (2013.01)
(58) Field of Classification Search
CPC .................... G06F 17/30864; G06F 16/30867; G06F 17/30463
USPC ........................................ 707/722, 736, 713
See application file for complete search history.

(56) References Cited

U.S. PATENT DOCUMENTS

| 8,117,542 | B2* | 2/2012 | Radtke et al. ................. 715/708 |
| 8,495,057 | B2* | 7/2013 | Palermiti et al. .............. 707/722 |
| 2012/0054039 | A1* | 3/2012 | Patwa et al. ................. 705/14.66 |
| 2013/0212534 | A1* | 8/2013 | Knight et al. ................. 715/838 |

* cited by examiner

*Primary Examiner* — Rehana Perveen
*Assistant Examiner* — Loc Tran
(74) *Attorney, Agent, or Firm* — Harrity & Harrity, LLP

(57) ABSTRACT

A computing device is configured to provide a search results document that includes information regarding images that have been identified as relevant to a search query, and receive a request to access an image provided in the search results document. The image may be associated with a document that includes the image. The computing device is configured to determine, based on the request, whether the document is image-centric with respect to the image, and selectively provide, based on whether the document is image-centric with respect to the image, an image overlay document corresponding to the image or the document associated with the image. The image overlay document may be provided when the document is not image-centric with respect to the image, and the document may be provided when the document is image-centric with respect to the image.

20 Claims, 12 Drawing Sheets

IMAGE-CENTRIC DOCUMENTS

RELATED APPLICATION

This application is a non-provisional of U.S. Provisional Application No. 61/653,207, filed May 30, 2012, the contents of which are incorporated herein by reference.

BACKGROUND

Many techniques are available to users today to find information on the World Wide Web. For example, users often use web browsers and/or search engines to find information of interest. In order to provide quality results to users, search engines often provide links to websites, images corresponding to websites, and other types of information. In some circumstances, when an image provided by a search engine is selected, the search engine may provide a sample or preview version of the image.

SUMMARY

According to some possible implementations, a method, performed by one or more computing devices, may include providing a search results document that includes information regarding a set of images that have been identified as relevant to a search query; receiving a request to access an image of the set of images provided in the search results document, where the image may be associated with a document that includes the image; determining based on the request, whether the document is image-centric with respect to the image; and selectively providing, based on whether the document is image-centric with respect to the image, an image overlay document corresponding to the image or the document associated with the image, where the image overlay document may be provided when the document is not image-centric with respect to the image, and the document may be provided when the document is image-centric with respect to the image.

According to some possible implementations, determining whether the document is image-centric may include searching data records, where the data records may indicate certain documents as image-centric with respect to certain images; and determining whether any of the data records indicate that the document is image-centric with respect to the image.

According to some possible implementations, the method may further include, prior to determining whether the document is image-centric, receiving image metadata corresponding to the image, where the image metadata may include information corresponding to user interactions with image overlay documents corresponding to the image; determining that the document is image-centric with respect to the image based on the image metadata; and creating a data record to indicate that the document is image-centric with respect to the image.

According to some possible implementations, determining whether the document is image-centric with respect to the image may include determining whether the document is image-centric, with respect to the image, based on image metadata, where the image metadata may include at least one of: click-through information corresponding to the image, where the click-through information may include information relating to the image being provided for display and, based on the image being provided, a request is received for the document associated with the image; image accesses information corresponding to the image, where the image accesses information may include information relating to a frequency or quantity of accesses corresponding to the document followed by accesses of the search results document; image quality information corresponding to the image, where the image quality information may include information relating to visual characteristics corresponding to the image; or image position information corresponding to the image, where the image position information may include information relating to a position of the image within the document.

According to some possible implementations, the image overlay document may include: the image, and an underlay version of the document, where the underlay version of the document may include a content of the document that is positioned behind the image, and the image may be positioned in front of the underlay version of the document.

According to some possible implementations, the method may further include receiving the search query, where the search query may include a search term; performing a search based on the search term; and providing a search result, within the search results document, based on the search, where the search result may include the image associated with the document.

According to some possible implementations, the method may further include identifying a user response to the image overlay document; and updating information used to determine whether the document is image-centric, with respect to the image, based on the user response.

According to some possible implementations, a system may include one or more server devices to: provide a search results document that includes information regarding a set of images that have been identified as relevant to a search query; receive a request to access an image of the set of images provided in the search results document, where the image may be associated with a document that includes the image; determine, based on the request, whether the document is image-centric with respect to the image; and selectively provide, based on whether the document is image-centric with respect to the image, an image overlay document corresponding to the image or the document associated with the image, where the image overlay document may be provided when the document is not image-centric with respect to the image, and the document may be provided, without providing the image overlay document, when the document is image-centric with respect to the image.

According to some possible implementations, at least one of the one or more server devices, when determining whether the document is image-centric, may search data records that indicate certain documents as image-centric with respect to certain images, and determine whether any of the data records indicate that the document is image-centric with respect to the image.

According to some possible implementations, at least one of the one or more server devices may receive image metadata corresponding to the image, where the image metadata may include information corresponding to user interactions with image overlay documents corresponding to the image; determine that the document is image-centric with respect to the image based on the image metadata; and create a data record to indicate that the document is image-centric with respect to the image.

According to some possible implementations, at least one of the one or more server devices, when determining whether the document is image-centric, may determine whether the document is image-centric, with respect to the image, based on image metadata, where the image metadata may include at least one of: click-through information corresponding to the image, where the click-through information may include information relating to the image being provided for display and, based on the image being provided, a request is received for the document associated with the image; image accesses information corresponding to the image, where the image accesses information may include information relating to a frequency or quantity of accesses corresponding to the document followed by accesses of the search results document; image quality information corresponding to the image, where the image quality information may include information relating to visual characteristics corresponding to the image; or image position information corresponding to the image, where the image position information may include information relating to a position of the image within the document.

According to some possible implementations, the image overlay document may include: the image; an underlay version of the document, where the underlay version of the document may include a content of the document that is positioned behind the image, and the image may be positioned in front of the underlay version of the document; and a navigation frame that includes: information corresponding to the image, a link corresponding to the document, a link corresponding to a full-size version of the image, a link to request another search results document comprising images similar to the image, or a link to request another search results document comprising search results based on search terms associated with the image.

According to some possible implementations, the image overlay document may include the image, and a navigation frame that includes: information corresponding to the image, a link corresponding to the document, a link corresponding to a full-size version of the image, a link to request another search results document comprising images similar to the image, or a link to request another search results document comprising search results based on the image.

According to some possible implementations, at least one of the one or more server devices may identify a user response to the image overlay document; and update information used to determine whether the document is image-centric, with respect to the image, based on the user response.

According to some possible implementations, a computer-readable medium may include a set of instructions which, when executed by one or more processors, cause the one or more processors to provide a search results document that includes information regarding a set of images that have been identified as relevant to a search query; receive a request to access an image, of the set of images, provided in the search results document, where the image may be associated with a document that includes the image; determine, based on the request, whether the document is image-centric with respect to the image; and selectively provide, based on whether the document is image-centric with respect to the image, an image overlay document corresponding to the image or the document associated with the image, where the image overlay document may be provided when the document is not image-centric with respect to the image, and the document may be provided, without providing the image overlay document, when the document is image-centric with respect to the image.

According to some possible implementations, the set of instructions, which when executed by the one or more processors, further cause the one or more processors to receive image metadata corresponding to the image, where the image metadata may include information corresponding to user interactions with image overlay documents corresponding to the image; determine that the document is image-centric with respect to the image based on the image metadata; and create a data record to indicate that the document is image-centric with respect to the image, where one or more instructions, of the set of instructions, to determine whether the document is image-centric with respect to the image include one or more instructions to determine that the document is image-centric based on the data record.

According to some possible implementations, one or more instructions, of the set of instructions, to determine whether the document is image-centric with respect to the image include one or more instructions to determine whether the document is image-centric, with respect to the image, based on image metadata, where the image metadata may include at least one of: click-through information corresponding to the image, where the click-through information may include information relating to the image being provided for display and, based on the image being provided, a request is received for the document associated with the image; image accesses information corresponding to the image, where the image accesses information may include information relating to a frequency or quantity of accesses corresponding to the document followed by accesses of the search results document; image quality information corresponding to the image, where the image quality information may include information relating to visual characteristics corresponding to the image; or image position information corresponding to the image, where the image position information may include information relating to a position of the image within the document.

According to some possible implementations, the image overlay document may include the image, and an underlay version of the document, where the underlay version of the document may include a content of the document that is positioned behind the image, and the image may be positioned in front of the underlay version of the document.

According to some possible implementations, the set of instructions, which when executed by the one or more processors, further cause the one or more processors to receive the search query comprising a search term; execute a search based on the search term; and provide a search result, within the search results document, based on the search, where the search result may include the image associated with the document.

According to some possible implementations, the set of instructions, which when executed by the one or more processors, further cause the one or more processors to identify a user response to the image overlay document; and update information used to determine whether the document is image-centric, with respect to the image, based on the user response.

According to some possible implementations, a system may include means for providing a search results document that includes information regarding a set of images that have been identified as relevant to a search query; means for receiving a request to access an image of the set of images provided in the search results document, where the image may be associated with a document that includes the image; means for determining based on the request, whether the document is image-centric with respect to the image; and means for selectively providing, based on whether the document is image-centric with respect to the image, an image overlay document corresponding to the image or the document associated with the image, where the image overlay document may be provided when the document is not image-centric with respect to the image, and the document may be provided when the document is image-centric with respect to the image.

The above discussion mentions examples in which some implementations may be implemented via one or more methods performed by one or more processors of one or more devices. In some implementations, one or more systems and/ or one or more devices may be configured to perform one or more of the acts mentioned above. In some implementations, a computer-readable medium may include computer-executable instructions which, when executed by one or more processors, cause the one or more processors to perform one or more of the acts mentioned above.

DETAILED DESCRIPTION

The following detailed description refers to the accompanying drawings. The same reference numbers in different drawings may identify the same or similar elements.

A system or method, described herein, may be used to enhance search engine services by selectively applying image overlay capabilities. The search engine services may be provided based on whether a web page is image-centric with regard to an image identified as a search result. A web page may be image-centric with regard to an image when, for example, a quality score corresponding to the image is greater than a particular threshold.

Figure 1:
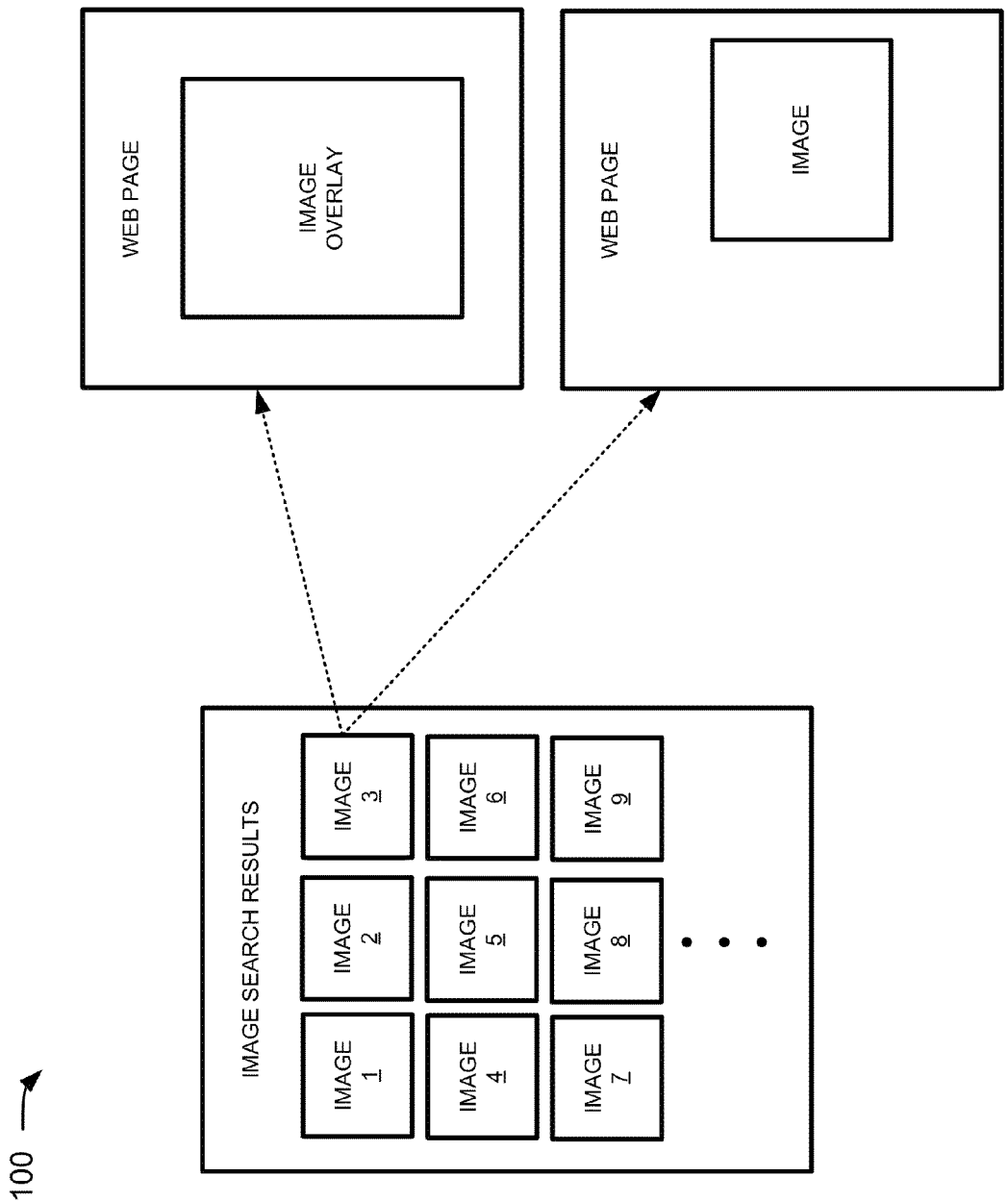
FIG. 1 is a diagram of an example overview according to one or more implementations described herein.

FIG. 1 is a diagram of an example overview 100 according to one or more implementations described herein. Referring to FIG. 1, a search engine may provide search results to a user via a search results document. The search results may include multiple images, and a user may select an image from the search results. If the image selected by the user corresponds to a web page that is not image-centric with respect to the selected image, the search engine may provide an image overlay document that displays a version of the image that is, for example, readily visible and provided along with a version of the web page. However, if the image selected by the user corresponds to a web page that is image-centric with respect to the image, the search engine may provide the actual web page. As such, the search engine may enhance search engine services by ensuring that image overlay documents are provided when appropriate.

The concepts described herein may be applied to sets of documents. In some implementations, the documents may be images, such as images indexed by an image search engine. More generally, a document may be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information, such as meta information, images, hyperlinks, etc., and/or embedded instructions, such as Javascript, etc. A link, as the term is used herein, is to be broadly interpreted to include any reference to a document from another document or another part of the same document.

Figure 2:
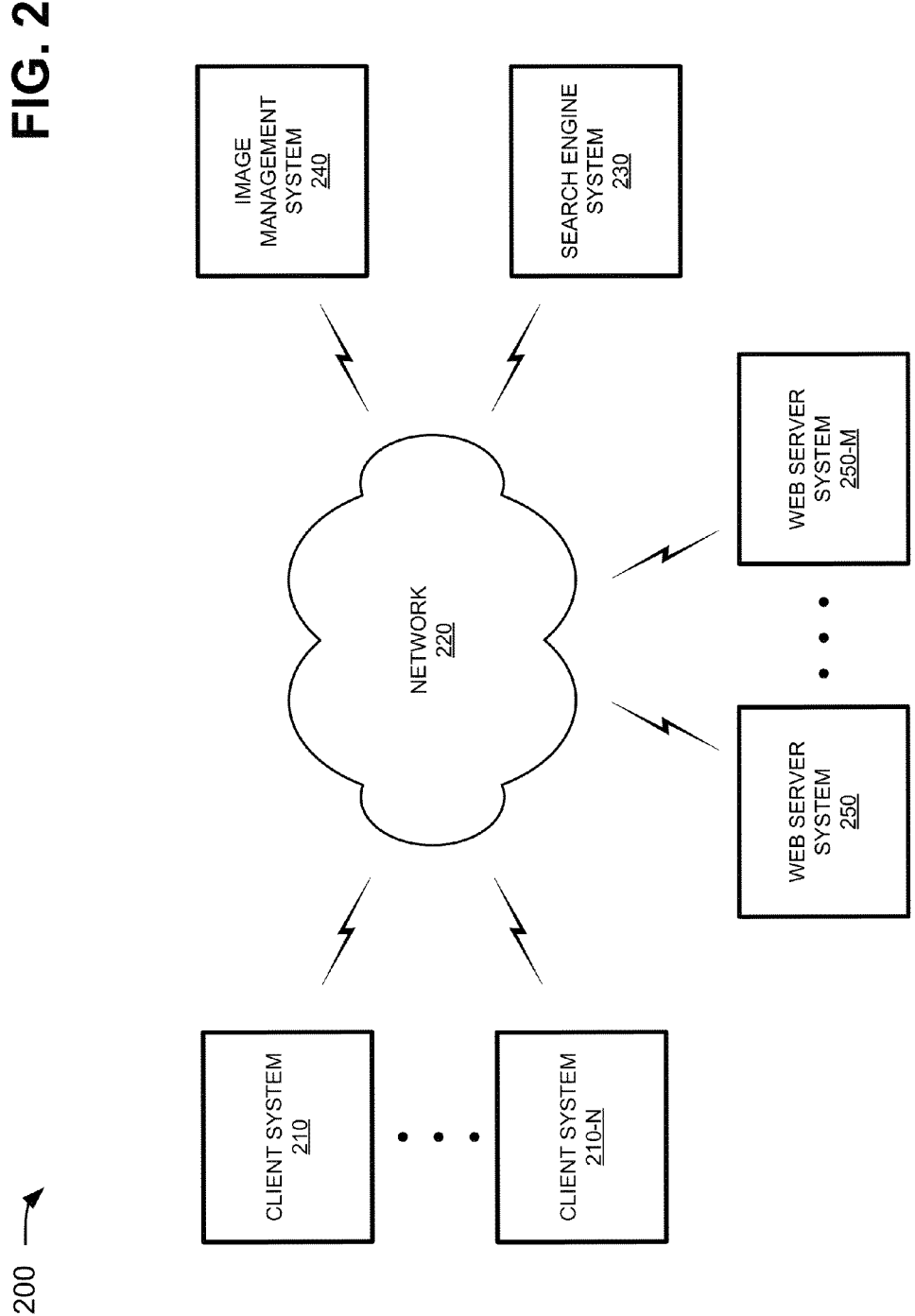
FIG. 2 is a diagram of an example environment in which systems and/or methods, described herein, may be implemented.

FIG. 2 is a diagram of an example environment 200 in which systems and/or methods described herein may be implemented. As depicted, environment 200 may include client systems 210-1, . . . , 210-N, where N≥1, hereinafter referred to collectively as "client systems 210," and individually as "client system 210;" network 220; search engine system 230; image management system 240; and web server systems 250-1, . . . , 250-M, where M≥1, hereinafter referred to collectively as "web server systems 250," and individually as "web server system 250." The number of systems and/or networks, illustrated in FIG. 2, is provided for explanatory purposes only. In practice, there may be additional systems and/or networks, fewer systems and/or networks, different systems and/or networks, or differently arranged systems and/or networks than illustrated in FIG. 2. For instance, in some implementations, search engine system 230 and image management system 240 may be implemented within the same system or device.

Also, in some implementations, one or more of the systems of environment 200 may perform one or more functions described as being performed by another one or more of the systems of environment 200. Systems of environment 200 may interconnect via wired connections, wireless connections, or a combination of wired and wireless connections.

Client system 210 may include one or more types of computing devices. For example, client system 210 may include a laptop computer, a desktop computer, a tablet computer, a netbook computer, a mobile telephone, e.g., a smart phone, or one or more other types of computing devices. Client system 210 may be capable of communicating with network 220. In some implementations, client system 210 may be capable of communicating a search query to search engine system 230 and/or receiving a search result from search engine system 230.

Network 220 may include any type of network and/or combination of networks. For example, network 220 may include a local area network ("LAN"), e.g., an Ethernet network, a wireless LAN, e.g., an 802.11 network, a wide area network, e.g., the Internet, and/or, a wireless WAN, e.g., a 3GPP System Architecture Evolution, a Global System for Mobile Communications network, a Universal Mobile Telecommunications System network, a Code Division Multiple Access 2000 network, a High-Speed Packet Access network, a Worldwide Interoperability for Microwave Access network, etc. Additionally, or alternatively, network 220 may include a virtual network, e.g., a virtual private network, a telephone network, e.g., a Public Switched Telephone Network, a cellular network, or another type of network.

Search engine system 230 may include one or more types of computing devices. For example, search engine system 230 may include a server, a cluster of servers, or one or more other types of computing devices. As depicted in FIG. 2, search engine system 230 may be capable of communicating with network 220. For instance, search engine system 230 may be capable of receiving a search query from client system 210, executing a search based on search terms included in the search query, and providing search results, resulting from the search, to client system 210. In some implementations, search engine system 230 may be capable of communicating and/or cooperating with image management system 240 to provide one or more aspects of the functionality described herein.

Image management system 240 may include one or more types of computing devices. For example, image management system 240 may include a desktop computer, a server, a cluster of servers, or one or more other types of computing devices. Image management system 240 may be capable of receiving a request to provide an image corresponding to a search result in a search results document and determining whether the document is image-centric with respect to the requested image. When the document is not image-centric, image management system 240 may create an image overlay document, corresponding to the document, and provide the image overlay document in accordance with the request; however, when the document is image-centric, image management system 240 may provide the document, instead of the image overlay document, in accordance with the request.

Web server system 250 may include one or more types of computing devices. For example, web server system 250 may include a server, a cluster of servers, or one or more other types of computing devices. Similar to the other systems of FIG. 2, web server system 250 may be capable of communicating with network 220. For instance, web server system 250 may include a server that is capable of storing documents, and capable of providing the documents, or information corresponding to the documents, to client systems 210, search engine system 230, and/or image management system 240.

Figure 3:
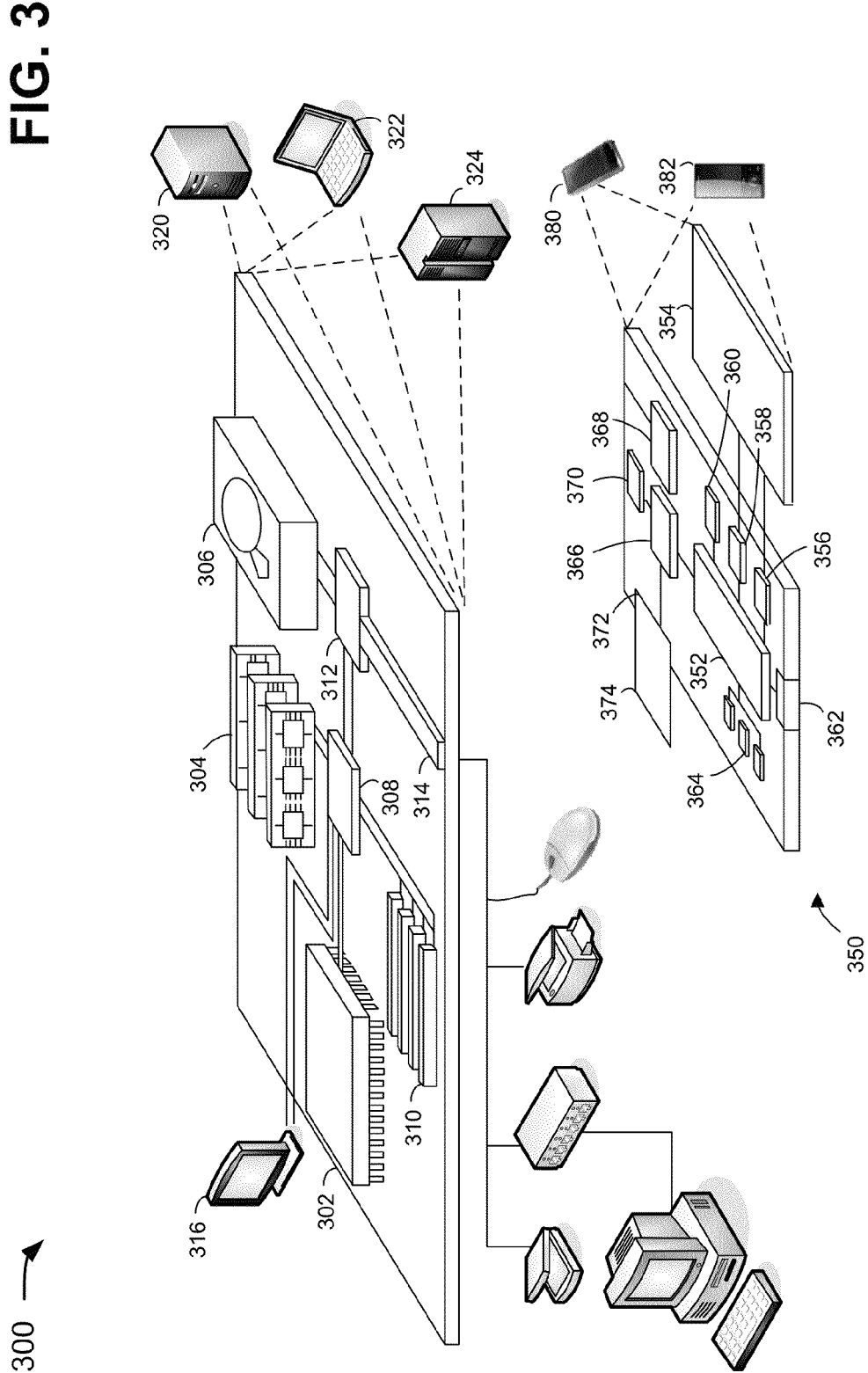
FIG. 3 is a diagram of example components of a device of FIG. 2.

FIG. 3 is a diagram of an example of a generic computing device 300 and a generic mobile computing device 350, which may be used with the techniques described here. Generic computing device 300 or generic mobile computing device 350 may correspond to, for example, client system 210, search engine system 230, image management system 240, and/or web server system 250. Each of client system 210, search engine system 230, image management system 240, or web server system 250 may include one or more generic computing devices 300 and/or generic mobile computing devices 350.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, tablet computers, and other similar computing devices. The components shown in FIG. 3, their connections and relationships, and their functions, are meant to be examples only, and are not meant to limit implementations described herein.

Computing device 300 may include a processor 302, a memory 304, a storage device 306, a high-speed interface 308 connecting to memory 304 and high-speed expansion ports 310, and a low-speed interface 312 connecting to a low-speed expansion port 314 and a storage device 306. Each of components 302, 304, 306, 308, 310, 312, and 314, are interconnected using various buses, and may be mounted on a common motherboard or in other manners as appropriate. Processor 302 can process instructions for execution within computing device 300, including instructions stored in memory 304 or on storage device 306 to display graphical information for a graphical user interface, e.g., a GUI, on an external input/output device, such as display 316 coupled to high-speed interface 308. In some implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within computing device 300. In some implementations, memory 304 includes a volatile memory unit or units. In some implementations, memory 304 may include a non-volatile memory unit or units. Memory 304 may also be another form of computer-readable medium, such as a magnetic or optical disk. A computer-readable medium may refer to a non-transitory memory device. A memory device may refer to storage space within a single storage device or storage space spread across multiple storage devices.

Storage device 306 is capable of providing mass storage for computing device 300. In some implementations, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or a memory on processor 302.

High-speed interface 308 manages bandwidth-intensive operations for computing device 300, while low-speed interface 312 manages lower bandwidth-intensive operations. Such allocation of functions is an example only. In some implementations, high-speed interface 308 is coupled to memory 304, display 316, e.g., through a graphics processor or accelerator, and to high-speed expansion ports 310, which may accept various expansion cards. In these implementations, low-speed interface 312 may be coupled to storage device 306 and low-speed expansion port 314. Low-speed expansion port 314, which may include various communication ports, e.g., USB, Bluetooth, Ethernet, wireless Ethernet, etc., may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, computing device 300 may be implemented as a standard server, or multiple times in a group of such servers. Computing device 300 may also be implemented as part of a rack server system 324. In addition, computing device 300 may be implemented in a personal computer, such as a laptop computer 322. Alternatively, components from computing device 300 may be combined with other components in a mobile device, such as mobile computing device 350. Each of such devices may contain one or more of computing devices 300, 350, and an entire system may be made up of multiple computing devices 300, 350 communicating with each other.

Mobile computing device 350 may include a processor 352, a memory 364, an input/output, e.g., an "I/O" device, such as a display 354, a communication interface 366, and a transceiver 368, among other components. Mobile computing device 350 may also be provided with a storage device, such as a micro-drive or other device, to provide additional storage. Each of the components 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD, e.g., a Thin-Film-Transistor Liquid Crystal Display, or an OLED, e.g., an Organic Light Emitting Diode, display, or other appropriate display technology. Display interface 356 may include appropriate circuitry for driving display 354 to present graphical and other information to a user. Control interface 358 may receive commands from a user and convert the commands for submission to processor 352. In addition, an external interface 362 may be provided in communication with processor 352, so as to enable near area communication of mobile computing device 350 with other devices. External interface 362 may provide, for example, for wired communication or for wireless communication, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM, e.g., a Single In Line Memory Module, card interface. Such expansion memory 374 may provide extra storage space for device 350, or may also store applications or other information for mobile computing device 350. Specifically, expansion memory 374 may include instructions to carry out or supplement the processes described herein, and may include secure information also. Thus, for example, expansion memory 374 may be provided as a security module for mobile computing device 350, and may be programmed with instructions that permit secure use of mobile computing device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as memory 364, expansion memory 374, or a memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, Shot Messaging Service, e.g., a SMS, Enhanced Messaging Service, e.g., a EMS, or Multimedia Messaging Service, e.g., a MMS, CDMA, Time Division Multiple Access, e.g., a TDMA, Personal Digital Cellular, e.g., a PDC, Wideband CDMA, e.g., a WCDMA, CDMA2000, or General Packet Radio Service, e.g., a GPRS, among others. Such communication may occur, for example, through transceiver 368. In addition, short-range communication may occur, such as using a Bluetooth, Wi-Fi, or other such transceiver. In addition, GPS, e.g., a Global Positioning System, receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert the received spoken information to digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, mobile computing device 350 may be implemented as a cellular telephone 380. Mobile computing device 350 may also be implemented as part of a smart phone 382, personal digital assistant, or other similar mobile device.

Various implementations of the systems and techniques described herein can be realized in digital electronic circuitry, integrated circuitry, specially designed ASICs, e.g., application specific integrated circuits, computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, e.g., magnetic discs, optical disks, memory, Programmable Logic Devices, used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube or liquid crystal display monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 4:
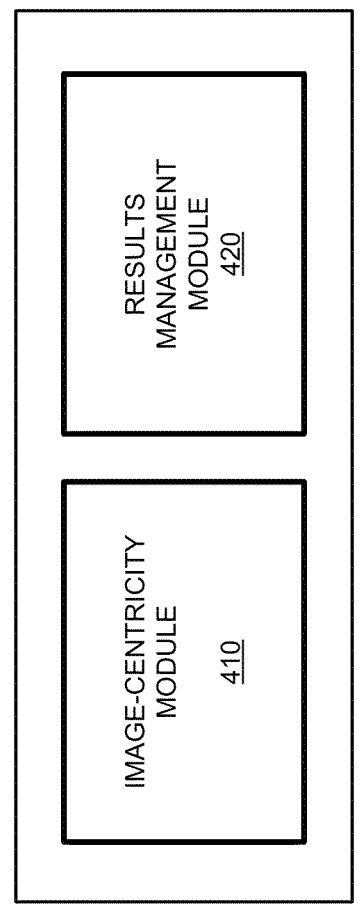
FIG. 4 a diagram of example functional components of an image management system according to one or more implementations described herein.

FIG. 4 is a diagram of example functional components of image management system 240 according to one or more implementations described herein. As depicted, image management system 240 may include an image-centricity module 410 and a results management module 420. Depending on the implementation, one or more of modules 410-420 may be implemented as a combination of hardware and software based on the components illustrated and described with respect to FIG. 3. Alternatively, modules 410-420 may each be implemented as hardware based on the components illustrated and described with respect to FIG. 3.

Image-centricity module 410 may provide functionality with respect to image-centricity. For example, results management module 410 may enable image management system 240 to receive image metadata corresponding to an image within a document, determine whether the document is image-centric based on the image metadata, and, based on the determination, designate whether the document is image-centric. When the document is image-centric, image management system 240 may create a data record identifying the image and/or document as image-centric. Image management system 240 may reference the data record later to determine image-centricity of a document in response to a request to provide the image. Whether the document is image-centric, with respect to an image, may depend on the image metadata corresponding to the image.

Results management module 420 may provide functionality with respect to search results. For example, results management module 420 may enable image management system 240 to receive a request to display an image corresponding to a search result, determine whether the document corresponding to the image is image-centric, and respond to the request accordingly. For instance, if the document is image-centric, image management system 240 may respond to the request by providing the document corresponding to the image. However, if the document is not image-centric, image management system 240 may create an image overlay document corresponding to the image, and provide the image overlay document in response the request. As described herein, the image overlay document may include an underlay version of the document, a modified version of the image as an overlay to the document, and/or a navigation frame corresponding to the document and the image.

In addition to the functionality described above, the functional components of image management system 240 may also, or alternatively, provide functionality as described elsewhere in this description. Further, while FIG. 4 shows a particular number and arrangement of modules, in some implementations, image management system 240 may include additional modules, fewer modules, different modules, or differently arranged modules than those depicted.

Figure 5:
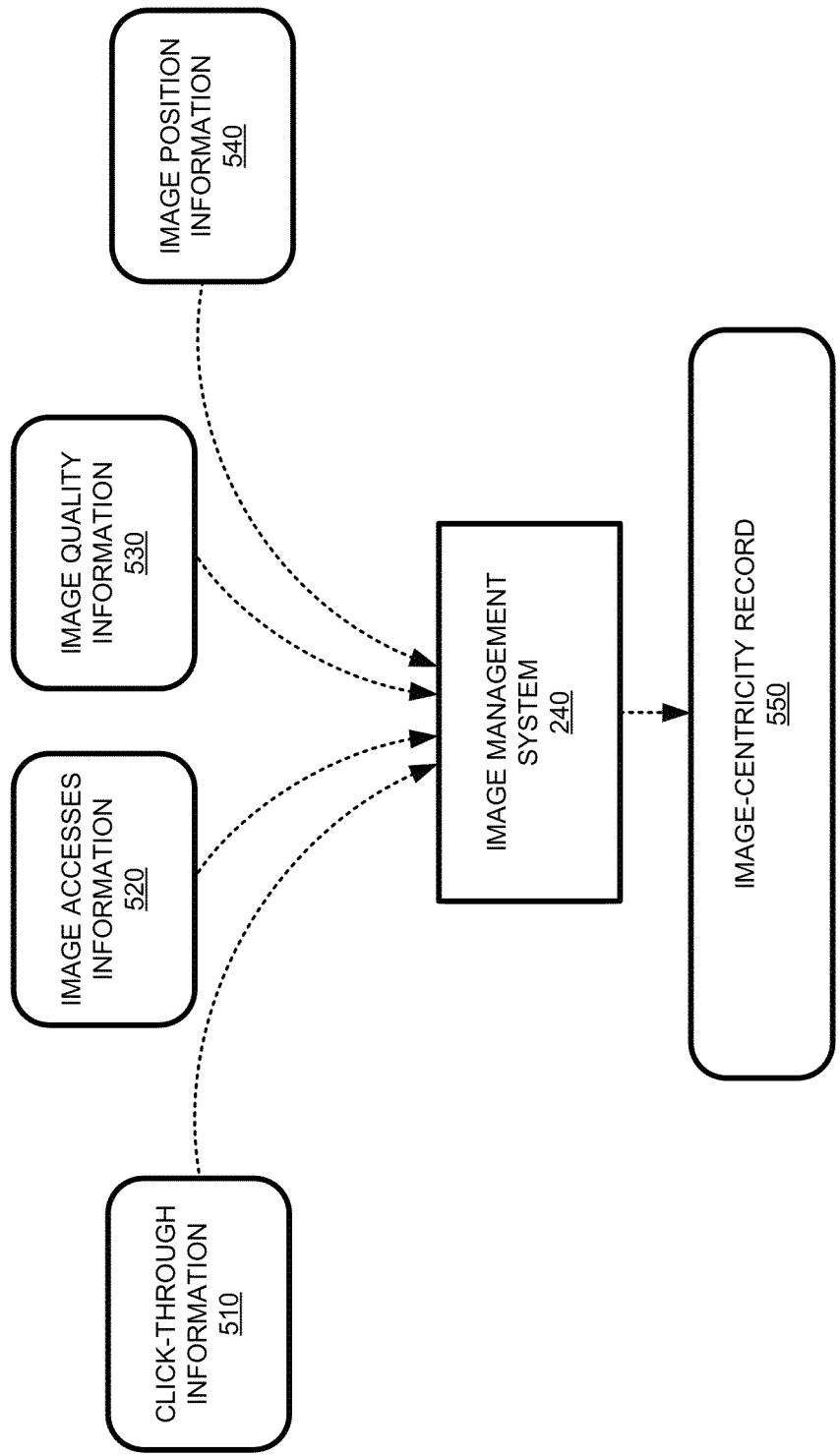
FIG. 5 is a diagram of an example of image metadata that may be considered by an image management system to determine whether a document is image-centric with respect to a particular image included in that document according to one or more implementations described herein.

FIG. 5 is a diagram of an example of image metadata 500 that may be considered by image management system 240 to determine whether a document is image-centric with respect to a particular image included in that document according to one or more implementations described herein. As depicted, image metadata 500 may include click-through information 510, image accesses information 520, image quality information 530, and image position information 540. While FIG. 5 shows examples of image metadata 500 that may be used by image management system 240, in some implementations, image metadata 500 may include additional information or different information than depicted in FIG. 5.

Click-through information 510 may include any type of information relating to a click-through event corresponding to an image overlay document—e.g., a scenario where a user is provided with an image overlay document and proceeds to click-through the image overlay document to access the corresponding document. For example, click-through information 510 may include a rate of click-through events corresponding to an image overlay document corresponding to a particular image, a quantity of click-through events corresponding to the image overlay document corresponding to the particular image, an average amount of time between presentation of the image overlay document corresponding to the particular image until a click-through event occurs with respect to the image overlay document corresponding to the particular image, or another type of information that relates to click-through events. Click-through information 510 may be aggregated, for multiple users, in an anonymous manner and only with the users' permission. Click-through information 510 may be helpful in determining whether a particular document is image-centric with respect to a particular image since users may have a tendency to click-through an image overlay document if the particular document includes a version of the image that is larger, has a greater level of resolution, is readily visible, or has another quality-related characteristic that is superior to the version of the image that is presented in the image overlay document.

Image accesses information 520 may include any type of information relating to an image being accessed by client system 210. For example, image accesses information 520 may include information regarding a frequency and/or quantity of times that a user is provided with an image overlay document from a list of search results, proceeds to click-through the image overlay document to access the corresponding document, and then returns to the list of search results. Alternatively, or additionally, image accesses information 520 may include information regarding an amount of time that the user spent on the document before returning to the list of search results. Image accesses information 520 may be aggregated, for multiple users, in an anonymous manner and only with the users' permission. Image accesses information 520 may be helpful in determining whether a particular document is image-centric with respect to a particular image since, when presented with the particular document, users may have a tendency to stay on the particular document if the particular document includes a version of the image that is larger, has a greater level of resolution, is readily visible, or has another quality-related characteristic that is superior to the version of the image that is presented in the image overlay document.

Image quality information 530 may include any type of information relating to the quality of a particular image. Image quality information 530 may include a visual characteristic of the image, such as an image size, an aspect ratio, an image resolution, a variability of colors corresponding to the image, etc., on a particular document. Additionally, or alternatively, image quality information 530 may include information regarding whether a content of the particular document is associated with a topic with which the image is also associated. Image quality information 530 may indicate that a particular document is image-centric with respect to a particular image when, for example, the image size, the aspect ratio, the image resolution, and/or another quality-related characteristic of the image, such as the topic associated with the image, exceed one or more image thresholds.

Image position information 540 may include any type of information relating to the position of an image in a document. For example, image position information 540 may include a set of coordinates, or another type of location information, that identifies a location of the image in the document. Image position information 540 may indicate that a particular document is image-centric with respect to a particular image when, for example, the image is located in a readily-visible location, such as at, or near, the top of the particular document.

Image management system 240 may use any or all of the types of image metadata discussed above to determine whether a document is image-centric with respect to a particular image. For example, image management system 240 may calculate a quality score based on one, or a combination, of the types of image metadata discussed above, and may determine whether the quality score exceeds a particular threshold. In some implementations, each type of image metadata that is used to calculate the quality score may be factored into the quality score equally. In some implementations, however, image management system 240 may calculate the quality score in a manner that places greater emphasis on one type of image metadata, such as click-through information 510, than one or more other types of image metadata, such as image accesses information 520, image quality information 530, and/or image position information 540.

While the image metadata has generally been described above as being particular to a document, such as a web page, the image metadata may also be used to determine whether another type of document, such as a web site, is image-centric with respect to images included in web pages of the web site. For example, image management system 240 may collect image metadata for a set of web pages associated with a particular web site. If image management system 240 determines that at least a threshold quantity, or ratio, of the web pages are image-centric for images on those web pages, then image management system 240 may determine that the web site, associated with those web pages, is image-centric for images. In this case, it may be inferred that all web pages, associated with that web site, are image-centric for images.

Image-centricity record 550 may include a data structure, such as a record in a table, a database, a linked list, or another form or arrangement of memory, which indicates whether a particular document is image-centric with respect to a particular image. As such, image-centricity record 550 may include a variety of information relating to the image-centricity of a document. For example, image-centricity record 550 may include an identifier corresponding to the document, such as a URL of the document, an identifier of the image, such as a file name of the image, an indication of whether the document is image-centric, and/or a quality score corresponding to the image-centricity of the document. Additionally, or alternatively, image-centricity record 550 may include additional information, such as a creation date that indicates the date that image-centricity record 550 was created, an expiration date that indicates when image-centricity record 550 is no longer valid for determining image-centricity and should be replaced or updated, etc.

Figure 6:
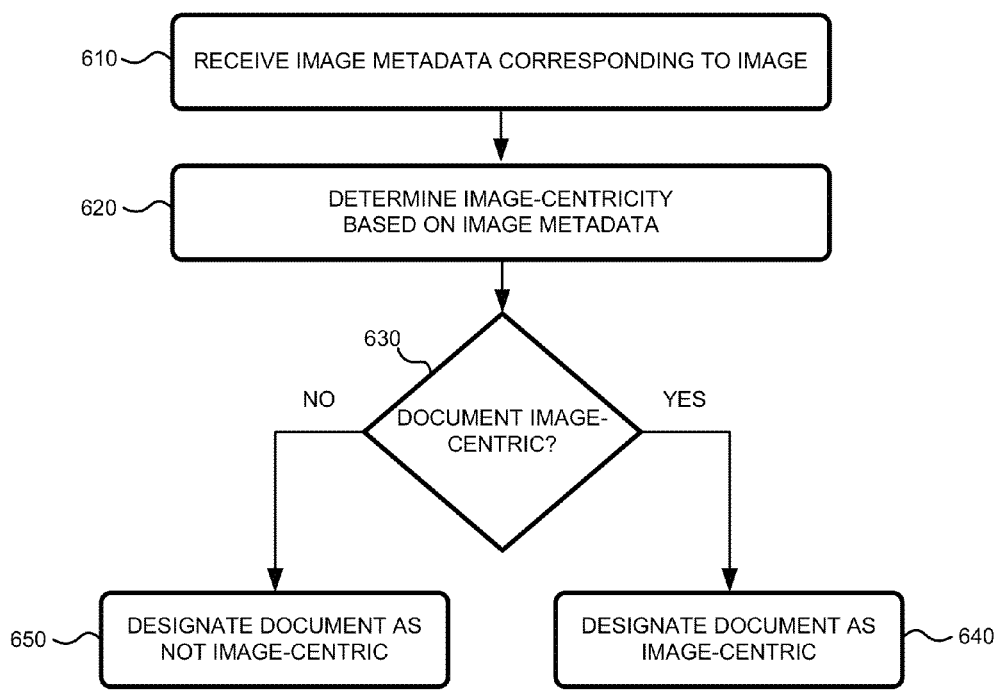
FIG. 6 is a diagram of an example process for determining image-centricity according to one or more implementations described herein.

FIG. 6 is a diagram of an example process 600 for determining image-centricity according to one or more implementations described herein. In one or more implementations, process 600 may be performed by one or more components of image management system 240. In some implementations, some or all of process 600 may be performed by one or more other components/devices, or a group of components/devices, including or excluding image management system 240.

As depicted in FIG. 6, process 600 may include receiving image metadata corresponding to an image (block 610). For example, image management system 240 may receive image metadata relating to the image, such as information corresponding to the manner in which a user of client system 210 has interacted with the image and/or information regarding a quality or position of the image. Examples of such image metadata may include click-through information 510, image accesses information 520, image quality information 530, and/or image position information 540.

Process 600 may also include determining image-centricity based on the image metadata (block 620). For example, image management system 240 may calculate a quality score corresponding to the image based on the image metadata received by image management system 240. Image management system 240 may compare the quality score to a particular threshold to determine whether the quality score satisfies the particular threshold. In some implementations, the quality score and the particular threshold may each include a number associated with a particular type of unit value, e.g., a quantity, a ratio, etc., so that the quality score and the particular threshold are readily comparable.

If the quality score satisfies the particular threshold (block 630—YES), process 600 may include designating the document, corresponding to the image, as image-centric (block 640). For example, image management system 240 may create image-centricity record 570, which may include information, such as a document identifier, e.g., a URL, of the document and information indicating the image-centric status of the document. The image-centricity record may be stored in an array, a table, a linked list, a database, or another type of data structure.

If the quality score does not satisfy the particular threshold (block 630—NO), process 600 may include designating the document as not being image-centric (block 650). For instance, image management system 240 may create a data record that indicates that the document is not image-centric. As mentioned above, the data record may include a variety of information, such as a document identifier of the document and status information indicating that the document is not image-centric.

While FIG. 6 shows a flowchart diagram of an example process 600 for determining image-centricity, in some implementations, a process for determining image-centricity may include fewer operations, different operations, differently arranged operations, or additional operations than depicted in FIG. 6. For example, instead of determining whether the score satisfies the particular threshold, image management system 240 may create a record that associates the image with the quality score, and whether the score is sufficient for the corresponding document to be considered image-centric may be determined at another time, e.g., in response to a request to display the image. Further, in some implementations, a process for determining image-centricity may not include an operation for designating that the document is not image-centric. For instance, if the quality score, corresponding to the document, does not satisfy the particular threshold, image management system 240 may simply not create an image-centricity record corresponding to the document.

Figure 7:
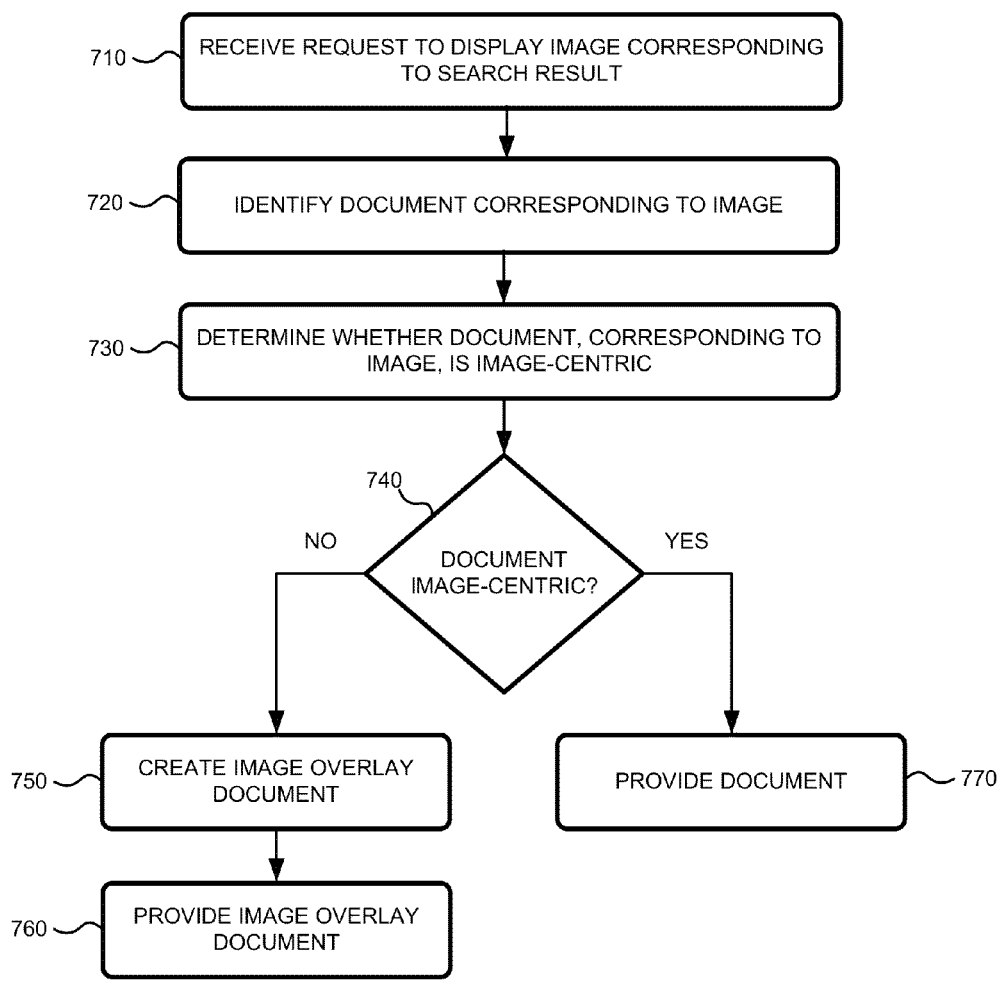
FIG. 7 is a diagram of an example process for providing a document according to one or more implementations described herein.

FIG. 7 is a diagram of an example process 700 for providing a document according to one or more implementations described herein. In one or more implementations, process 700 may be performed by one or more components of image management system 240. In some implementations, some or all of process 700 may be performed by one or more other components/devices, or a group of components/devices, including or excluding image management system 240. In some implementations, some or all of process 700 may be performed by another device, such as search engine system 230. A description of FIG. 6 is provided below with reference to FIGS. 8-12.

As depicted, process 700 may include receiving a request to display an image corresponding to a search result (block 710). For instance, image management system 240 may receive a request to display an image corresponding to a search result provided to client system 210. In some implementations, search results may have been provided to client system 210 from search engine system 230 in response to a search query submitted by client system 210. Examples relating to performing a search and displaying search results are discussed below with reference to FIGS. 8-10.

Figure 8:
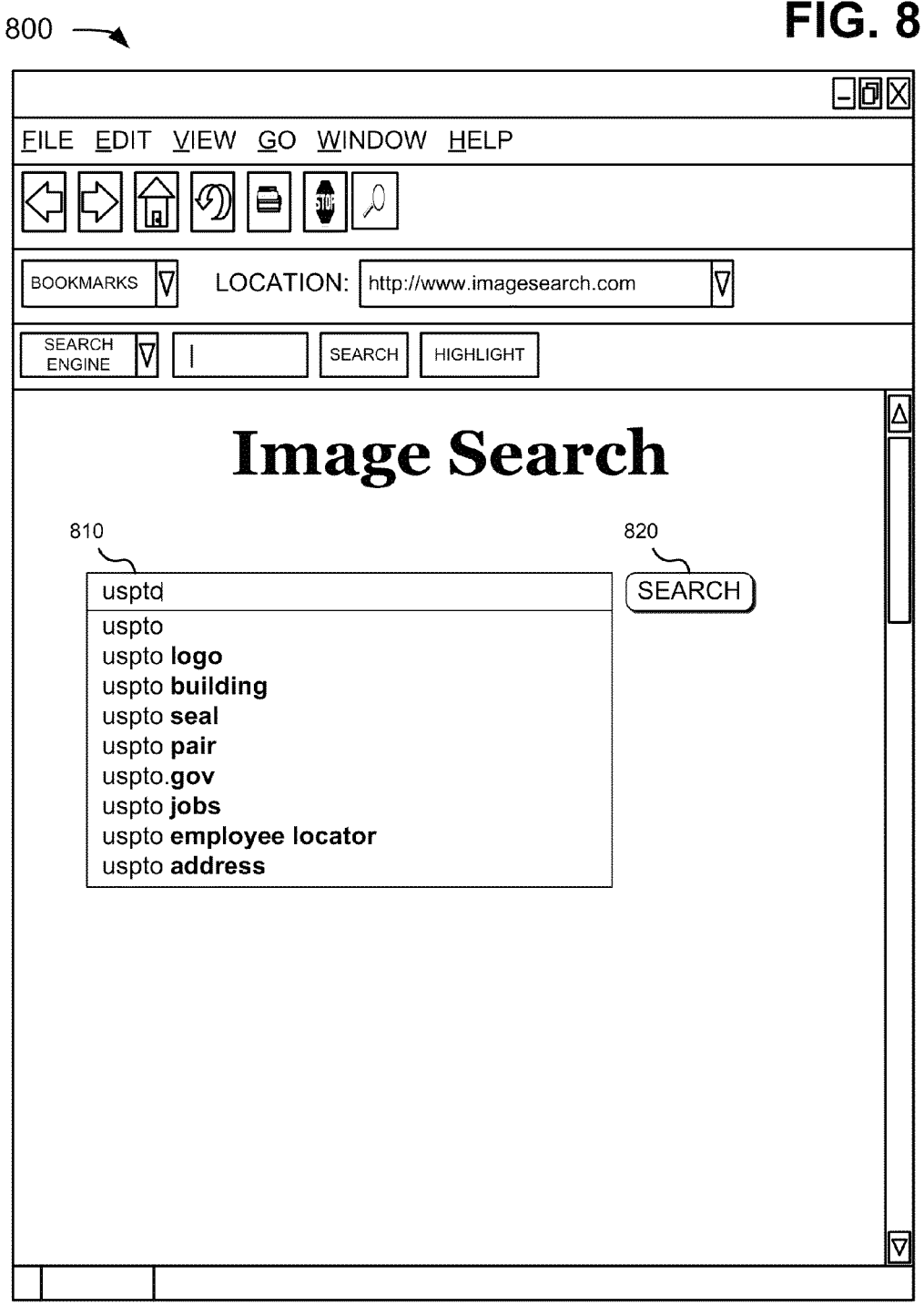
FIG. 8 is a diagram of an example document for inputting a search query according to one or more implementations described herein.

FIG. 8 is a diagram of an example document 800 for inputting a search query according to one or more implementations described herein. As depicted, document 800 may include a search box 810 and a search command button 820. In some implementations, document 800 may be provided to client system 210 by image management system 240. While FIG. 8 shows a particular number and arrangement of features, in some implementations, an example document 800 may include additional features, fewer features, different features, or differently arranged features than those depicted in FIG. 8.

One or more search terms may be typed or otherwise entered into document 800 via search box 810. For instance, a user of client system 210 may input the search term "uspto" into search box 810. As depicted in FIG. 8, one or more search terms may be suggested based on the information entered into search box 810. Search command button 820 may be used to initiate a search based on the search terms entered into search box 810. For example, a user of client system 210 may press or select search command button 820 to cause a search to be performed based on the search term "uspto."

Figure 9:
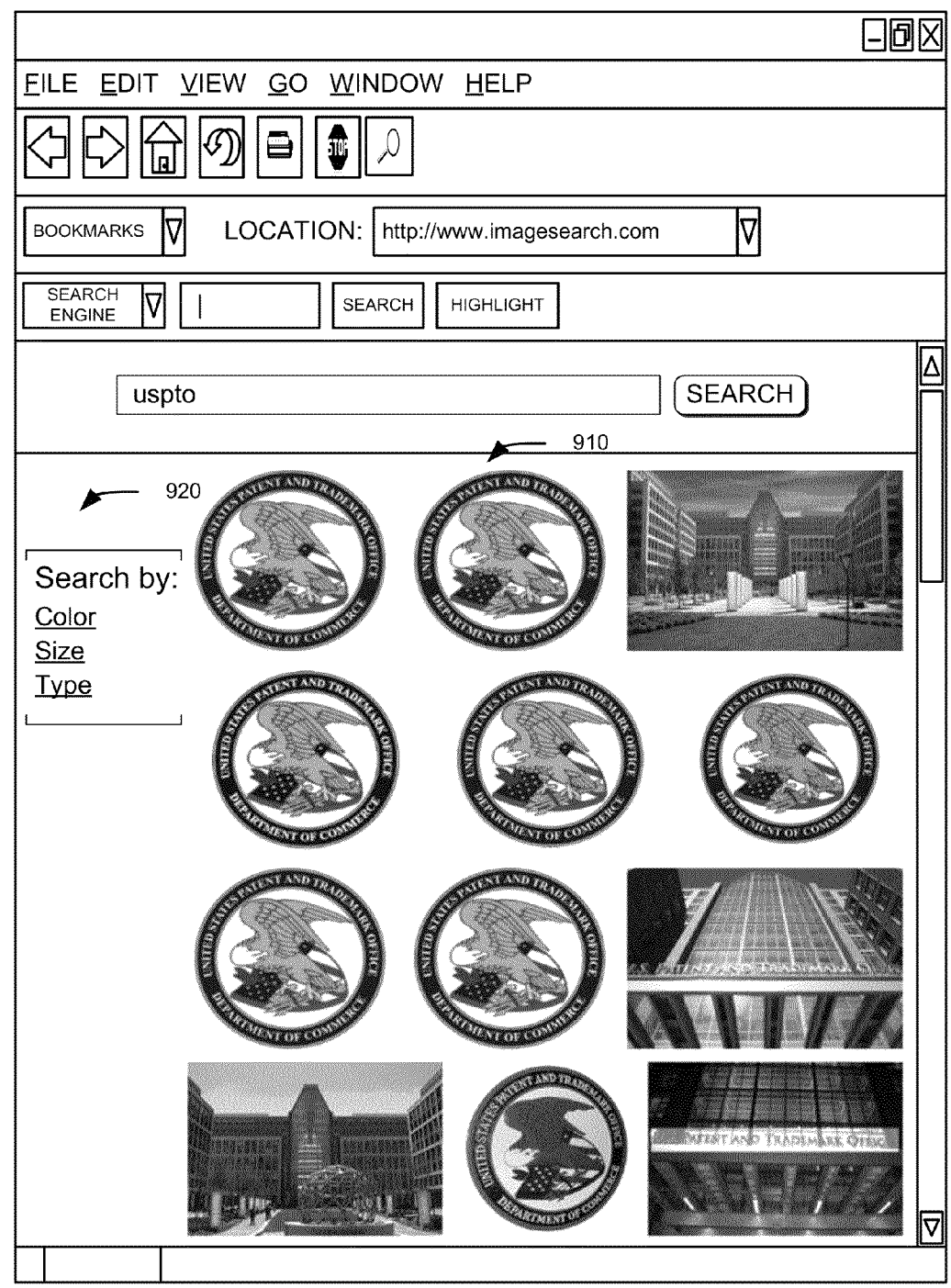
FIGS. 9-10 are diagrams of an example search results document according to one or more implementations described herein.
Figure 10:
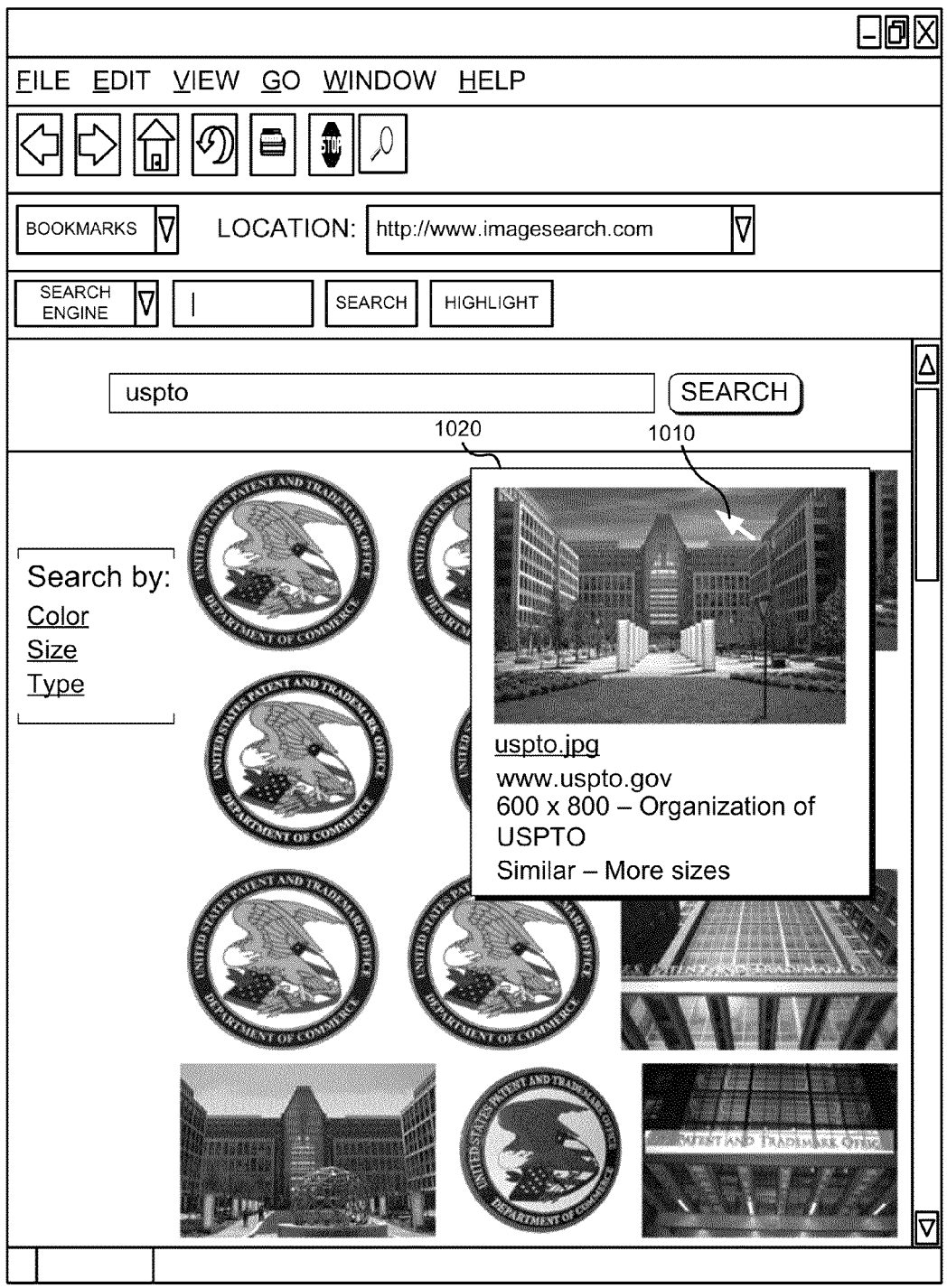

FIGS. 9-10 are diagrams of an example search results document 900 according to one or more implementations described herein. As depicted, search results document 900 may include multiple images 910 that are displayed in a ranked list. Images 910 may be presented according to one or more criteria, such as relevance to one or more search terms, popularity, quality, etc. As illustrated, search results document 900 may also include one or more search tools 920 to enable a user to introduce one or more constraints into a search, such as image color, image size, image type, e.g., photo, line drawing, etc.

As illustrated in FIG. 10, a user may operate an input device, such as a mouse, to point, e.g., with pointer 1010, to an image within search results document 900, which may result in an enlarged version of the image, e.g., image 1020, being provided. A user may use the input device to select the image, which may result in, for example, image management system 240 receiving a request to display the selected image as discussed above with reference to block 710 of FIG. 7. Selection of the image may occur by clicking on the image or by hovering pointer 1010 over the image for more than a particular amount of time.

Returning to FIG. 7, process 700 may also include identifying a document corresponding to the image (block 720). For example, image management system 240 may identify a document that includes the image corresponding to the request. In some implementations, image management system 240 may identify the document based on information, such as a URL or another type of identifier included in the request to display the image.

Process 700 may include determining whether the document is image-centric (block 730). For instance, image management system 240 may determine whether the document is image-centric, with respect to image 1020, based on image-centricity record 570. Additionally, or alternatively, image management system 240 may determine whether the document is image-centric by performing one or more additional operations corresponding to the image and/or the document, such as one or more of the operations described above with reference to FIG. 6.

As illustrated in FIG. 7, if the document is not image-centric (block 740—NO), process 700 may include creating an image overlay document (block 750). For instance, image management system 240 may create an image overlay document when a request to display image 1020 is received, and image 1020 does not correspond to a document that is image-centric with respect to image 1020. An image overlay document, as described herein, may include a variety of information that is formatted and/or arranged in one or more of a variety of ways.

Process 700 may include providing the image overlay document (block 760). For example, image management system 240 may provide image overlay document to client system 210. The image overlay document, provided to client system 210, may enable a user of client system 210 to interact with the requested image, and the corresponding document, in one or more of a variety of ways.

Figure 11:
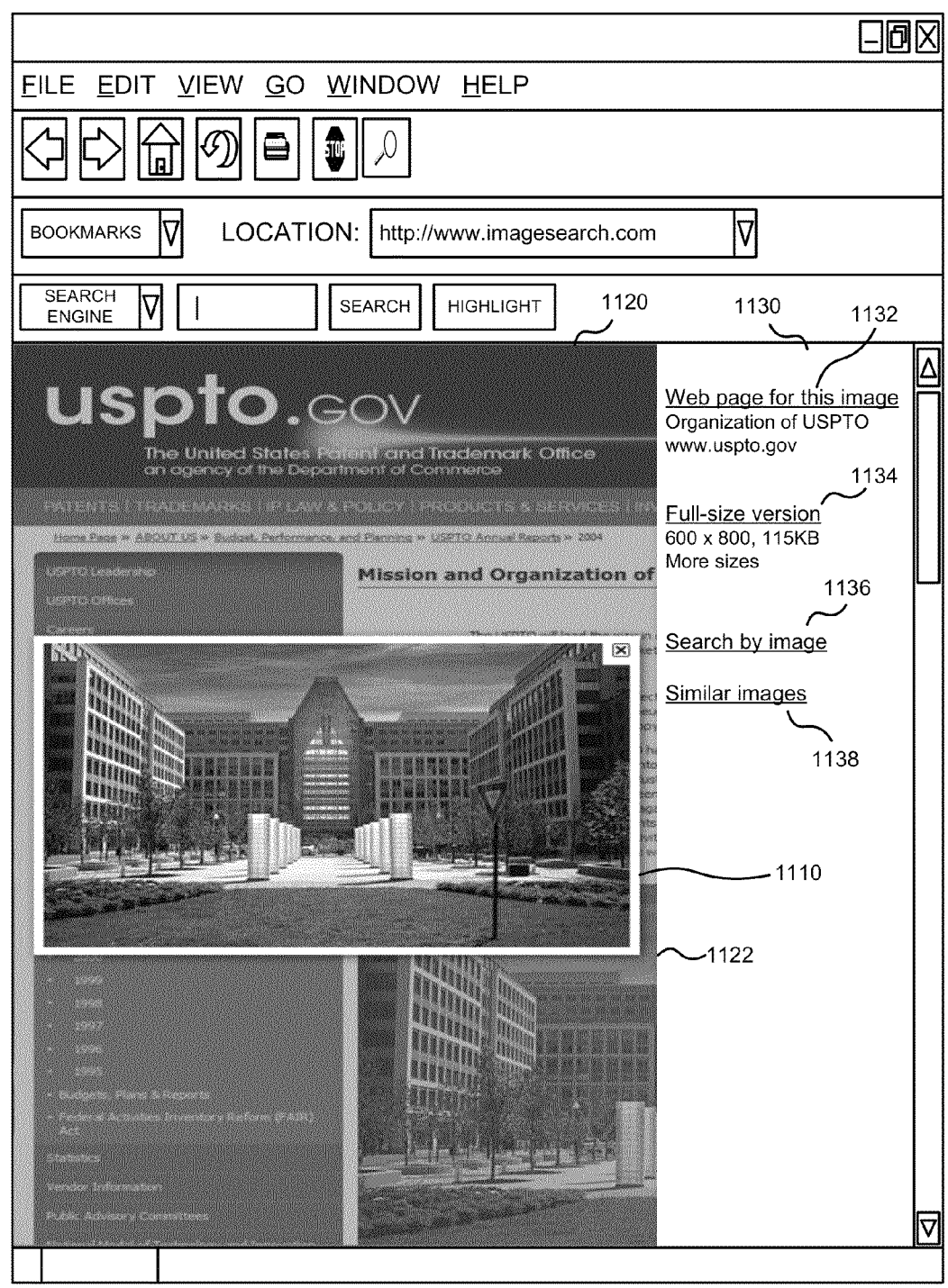
FIG. 11 is a diagram of an example image overlay document according to one or more implementations described herein.

FIG. 11 is a diagram of an example image overlay document 1100 according to one or more implementations described herein. As depicted, image overlay document 1100 may include an overlay image 1110, an underlay document 1120, and a navigation frame 1130. While FIG. 11 shows a particular number and arrangement of features, e.g., overlay image 1110, underlay document 1120, and a navigation frame 1130, in some implementations, an example document 1100 may include additional features, fewer features, different features, or differently arranged features than those depicted in FIG. 11.

Overlay image 1110 may correspond to image 1020 that was provided as a search result and that has been requested for display. Additionally, or alternatively, overlay image 1110 may correspond to an image within underlay document 1120, e.g., image 1122. Overlay image 1110 and/or underlay document 1120 may be arranged and/or presented in a manner that enhances the visibility of overlay image 1110. For instance, as depicted in FIG. 11, overlay image 1110 may be positioned at or near a center of image overlay document 1100, and underlay document 1120 may be shaded, or otherwise modified, to further enhance the visibility of overlay image 1110.

Navigation frame 1130 may include one or more navigation tools corresponding to overlay image 1110 and/or underlay document 1120. For instance, as depicted in FIG. 11, navigation frame 1130 may include a link 1132 to the document corresponding to underlay document 1120, a link 1134 to the image of overlay image 1110, a link 1136 to execute a search query for various types of web content relating to overlay image 1110, and a link 1138 to execute a search query for images similar to overlay image 1110. Accordingly, image overlay document 1100 may include various types of information relating to enhanced search engine services. As described above, image management system 240 may provide an image overlay document 1100 in response to receiving a request to display a particular image that corresponds to a document that is not image-centric with respect to the particular image.

Returning to FIG. 7, if the document is image-centric (block 740—YES), process 700 may include providing the document (block 770). For instance, image management system 240 may provide the document, which includes image 1020, to client system 210 when the document is image-centric with respect to image 1020.

Figure 12:
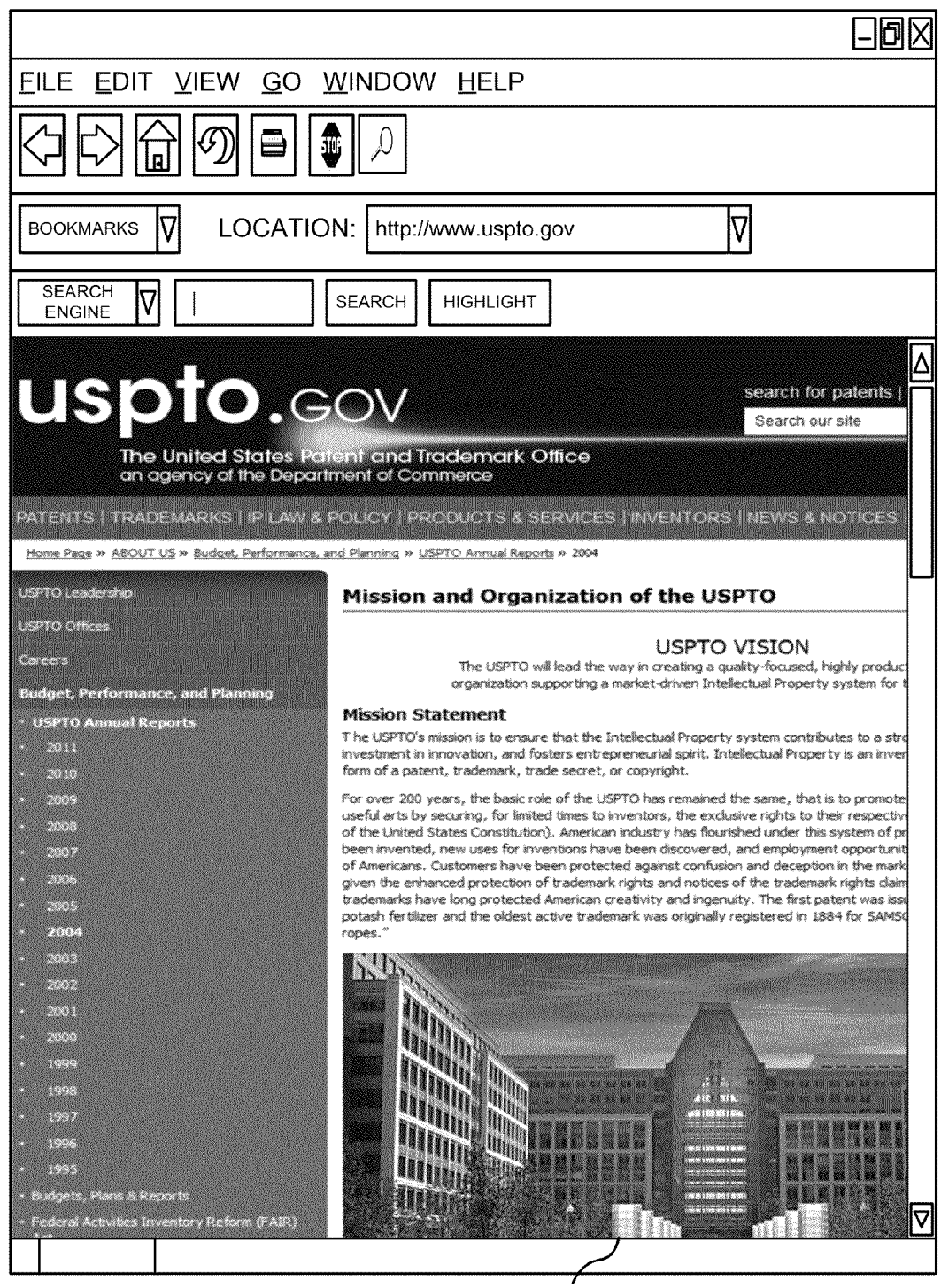
FIG. 12 is a diagram of an example document according to one or more implementations described herein.

FIG. 12 is a diagram of an example document 1200 according to one or more implementations described herein. Document 1200 may correspond to underlay document 1120, and may include the image 1020 selected by the user. As mentioned above, image management system 240 may provide document 1200 in response to receiving a request to display image 1020 if document 1200 is determined to be image-centric with respect to image 1020.

While FIG. 7 shows a flowchart diagram of an example process 700 for providing a document, in some implementations, a process for providing a document may include fewer operations, different operations, differently arranged operations, or additional operations than depicted in FIG. 7. For example, in some implementations, image management system 240 may include, or otherwise cooperate with, search engine system 230 to receive search query requests from client systems 210, execute search query operations based on search terms included in the search query requests, and provide search results, corresponding to the search query operations, to client system 210.

Alternatively, or additionally, image management system 240 may use information regarding the user's interactions with the image overlay document and/or the document, which includes the image, to update the image metadata associated with the image.

Accordingly, a system and a method, described herein, may be used to selectively apply image overlay capabilities to enhance search results. For example, image management system 240 may receive a request to display an image corresponding to a search result and determine whether a document, corresponding to the image, is image-centric with respect to the image. When the document is not image-centric with respect to the image, image management system 240 may create an image overlay document, corresponding to the document, and provide the image overlay document in accordance with the request. When the document is image-centric with respect to the image, image management system 240 may provide the document in accordance with the request. As such, a system and a method, discussed herein, may enhance search engine services by ensuring that image overlay documents are only provided when appropriate, e.g., when the corresponding document does not provide a high-quality and readily visible version of the image.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. A component may include hardware, such as an ASIC or a field-programmable gate array, e.g., a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method performed by one or more computing devices, the method comprising:
   providing, by at least one of the one or more computing devices, a search results document that includes information regarding a plurality of images that have been identified as relevant to a search query;
   receiving, by at least one of the one or more computing devices, a request to access an image of the plurality of images provided in the search results document,
      the image being associated with a document that includes the image;
   determining, by at least one of the one or more computing devices and based on the request, whether the document is image-centric with respect to the image; and
   selectively providing, by at least one of the one or more computing devices and based on whether the document is image-centric with respect to the image, an image overlay document corresponding to the image or the document associated with the image,
      the image overlay document being provided when the document is not image-centric with respect to the image, and
      the document being provided when the document is image-centric with respect to the image.

2. The method of claim 1, where determining whether the document is image-centric, comprises:
   searching data records,
      the data records indicating certain documents as image-centric with respect to certain images; and
   determining whether any of the data records indicate that the document is image-centric with respect to the image.

3. The method of claim 1, further comprising:
   prior to determining whether the document is image-centric,
      receiving image metadata corresponding to the image,
         the image metadata comprising information corresponding to user interactions with image overlay documents corresponding to the image;

determining that the document is image-centric with respect to the image based on the image metadata; and
creating a data record to indicate that the document is image-centric with respect to the image.

4. The method of claim 1, where determining whether the document is image-centric with respect to the image includes:
determining whether the document is image-centric, with respect to the image, based on image metadata,
the image metadata comprising at least one of:
click-through information corresponding to the image,
the click-through information comprising information relating to the image being provided for display and, based on the image being provided, a request is received for the document associated with the image;
image accesses information corresponding to the image,
the image accesses information comprising information relating to a frequency or quantity of accesses corresponding to the document followed by accesses of the search results document;
image quality information corresponding to the image,
the image quality information comprising information relating to visual characteristics corresponding to the image; or
image position information corresponding to the image,
the image position information comprising information relating to a position of the image within the document.

5. The method of claim 1, where the image overlay document comprises:
the image, and
an underlay version of the document,
the underlay version of the document comprising a content of the document that is positioned behind the image, and
the image being positioned in front of the underlay version of the document.

6. The method of claim 1, further comprising:
receiving the search query,
the search query comprising a search term;
performing a search based on the search term; and
providing a search result, within the search results document, based on the search,
the search result comprising the image associated with the document.

7. The method of claim 1, further comprising:
identifying a user response to the image overlay document; and
updating information used to determine whether the document is image-centric, with respect to the image, based on the user response.

8. A system, comprising:
one or more server devices to:
provide a search results document that includes information regarding a plurality of images that have been identified as relevant to a search query;
receive a request to access an image of the plurality of images provided in the search results document,
the image being associated with a document that includes the image;
determine, based on the request, whether the document is image-centric with respect to the image; and
selectively provide, based on whether the document is image-centric with respect to the image, an image overlay document corresponding to the image or the document associated with the image,
the image overlay document being provided when the document is not image-centric with respect to the image, and
the document being provided, without providing the image overlay document, when the document is image-centric with respect to the image.

9. The system of claim 8, where, when determining whether the document is image-centric, at least one of the one or more server devices is to:
search data records that indicate certain documents as image-centric with respect to certain images, and
determine whether any of the data records indicate that the document is image-centric with respect to the image.

10. The system of claim 8, where at least one of the one or more server devices is further to:
receive image metadata corresponding to the image,
the image metadata comprising information corresponding to user interactions with image overlay documents corresponding to the image,
determine that the document is image-centric with respect to the image based on the image metadata, and
create a data record to indicate that the document is image-centric with respect to the image.

11. The system of claim 8, where, when determining whether the document is image-centric, at least one of the one or more server devices is to:
determine whether the document is image-centric, with respect to the image, based on image metadata,
the image metadata comprising at least one of:
click-through information corresponding to the image,
the click-through information comprising information relating to the image being provided for display and, based on the image being provided, a request is received for the document associated with the image,
image accesses information corresponding to the image,
the image accesses information comprising information relating to a frequency or quantity of accesses corresponding to the document followed by accesses of the search results document,
image quality information corresponding to the image,
the image quality information comprising information relating to visual characteristics corresponding to the image, or
image position information corresponding to the image,
the image position information comprising information relating to a position of the image within the document.

12. The system of claim 8, where the image overlay document comprises:
the image,
an underlay version of the document,
the underlay version of the document comprising a content of the document that is positioned behind the image, and
the image being positioned in front of the underlay version of the document, and
a navigation frame comprising:
information corresponding to the image,
a link corresponding to the document,
a link corresponding to a full-size version of the image,
a link to request another search results document comprising images similar to the image, or
a link to request another search results document comprising search results based on search terms associated with the image.

13. The system of claim 8, where the image overlay document comprises:
the image, and
a navigation frame comprising:
information corresponding to the image,
a link corresponding to the document,
a link corresponding to a full-size version of the image,
a link to request another search results document comprising images similar to the image, or
a link to request another search results document comprising search results based on the image.

14. The system of claim 8, where at least one of the one or more server devices is further to:
identify a user response to the image overlay document; and
update information used to determine whether the document is image-centric, with respect to the image, based on the user response.

15. A non-transitory computer-readable medium, comprising:
a plurality of instructions which, when executed by one or more processors, cause the one or more processors to:
provide a search results document that includes information regarding a plurality of images that have been identified as relevant to a search query;
receive a request to access an image, of the plurality of images, provided in the search results document,
the image being associated with a document that includes the image;
determine, based on the request, whether the document is image-centric with respect to the image; and
selectively provide, based on whether the document is image-centric with respect to the image, an image overlay document corresponding to the image or the document associated with the image,
the image overlay document being provided when the document is not image-centric with respect to the image, and
the document being provided, without providing the image overlay document, when the document is image-centric with respect to the image.

16. The non-transitory computer-readable medium of claim 15,
where the plurality of instructions, which when executed by the one or more processors, further cause the one or more processors to:
receive image metadata corresponding to the image,
the image metadata comprising information corresponding to user interactions with image overlay documents corresponding to the image;
determine that the document is image-centric with respect to the image based on the image metadata; and
create a data record to indicate that the document is image-centric with respect to the image, and
where one or more instructions, of the plurality of instructions, to determine whether the document is image-centric with respect to the image include one or more instructions to determine that the document is image-centric based on the data record.

17. The non-transitory computer-readable medium of claim 15, where one or more instructions, of the plurality of instructions, to determine whether the document is image-centric with respect to the image include:
one or more instructions to determine whether the document is image-centric, with respect to the image, based on image metadata,
the image metadata comprising at least one of:
click-through information corresponding to the image,
the click-through information comprising information relating to the image being provided for display and, based on the image being provided, a request is received for the document associated with the image,
image accesses information corresponding to the image,
the image accesses information comprising information relating to a frequency or quantity of accesses corresponding to the document followed by accesses of the search results document,
image quality information corresponding to the image,
the image quality information comprising information relating to visual characteristics corresponding to the image, or
image position information corresponding to the image,
the image position information comprising information relating to a position of the image within the document.

18. The non-transitory computer-readable medium of claim 15, where the image overlay document comprises:
the image, and
an underlay version of the document,
the underlay version of the document comprising a content of the document that is positioned behind the image, and
the image being positioned in front of the underlay version of the document.

19. The non-transitory computer-readable medium of claim 15, where the plurality of instructions, which when executed by the one or more processors, further cause the one or more processors to:
receive the search query comprising a search term;
execute a search based on the search term; and
provide a search result, within the search results document, based on the search, the search result comprising the image associated with the document.

20. The non-transitory computer-readable medium of claim 15, where the plurality of instructions, which when executed by the one or more processors, further cause the one or more processors to:
identify a user response to the image overlay document; and
update information used to determine whether the document is image-centric, with respect to the image, based on the user response.

* * * * *